United States Patent [19]
Gallot et al.

[11] 4,325,675
[45] Apr. 20, 1982

[54] BLADE PROFILE FOR ROTARY WING OF AN AIRCRAFT

[75] Inventors: Jacques Gallot, Sausset les Pins; Georges Vingut, Marseilles; Michel V. de Paul, Senlis; Jean-Jacques Thibert, Verriere-le Buisson, all of France

[73] Assignees: Societe Nationale Industrielle Aerospatiale, Paris; Office National d'Etudes etc., Chatillon, both of France

[21] Appl. No.: 100,350

[22] Filed: Dec. 5, 1979

[30] Foreign Application Priority Data

Aug. 10, 1979 [FR] France ............................... 7920454

[51] Int. Cl.³ .................... B64C 27/46; B64C 3/14
[52] U.S. Cl. .................... 416/223 R; 416/DIG. 2
[58] Field of Search .................. 416/223 R, DIG. 2; 244/35 R

[56] References Cited

U.S. PATENT DOCUMENTS

| | | | |
|---|---|---|---|
| 1,981,392 | 11/1934 | Selman | 416/223 R |
| 2,257,260 | 9/1941 | Kartveli | 244/35 R |
| 2,281,272 | 4/1942 | Davis | 244/35 R |
| 2,441,151 | 5/1948 | Jones | 416/223 R |
| 2,448,698 | 9/1948 | Biot et al. | 244/35 R X |
| 2,450,440 | 10/1948 | Mills | 416/223 R |
| 3,173,490 | 3/1965 | Stuart | 416/223 R |
| 3,343,512 | 9/1967 | Rasmussen | 416/DIG. 2 |
| 3,946,688 | 3/1976 | Gornstein et al. | 416/223 R X |
| 4,046,489 | 9/1977 | Fairchild et al. | 416/223 R |
| 4,240,598 | 12/1980 | Espin et al. | 416/223 R X |

FOREIGN PATENT DOCUMENTS

| | | | |
|---|---|---|---|
| 2401684 | 7/1975 | Fed. Rep. of Germany | 244/35 R |
| 27845 | 7/1972 | Japan | 416/DIG. 2 |
| 110068 | 3/1944 | Sweden | 416/DIG. 2 |

*Primary Examiner*—Everette A. Powell, Jr.
*Attorney, Agent, or Firm*—Merriam, Marshall & Bicknell

[57] ABSTRACT

The present invention relates to a blade profile for rotary wing of an aircraft, comprising, between the leading edge and the trailing edge, a convex upper surface and a non-concave lower surface, wherein, at the point of maximum curvature of the leading edge, the radius of curvature Ro is approximately defined by the expression $Ro = 1.7 \, C \cdot e_{max}^2$, in which C represents the chord and $e_{max}$ the relative thickness of said profile and the portion of lower surface adjacent the leading edge extends to about 20% of the chord from said leading edge and presents a very small general curvature decreasing continuously in the direction of the trailing edge up to the point of minimum curvature of the lower surface. The invention is more particularly applicable to obtaining rotary wings, for example for helicopters, capable of very high performances both when hovering, and in high speed flight, as well as during manoeuvres.

9 Claims, 7 Drawing Figures

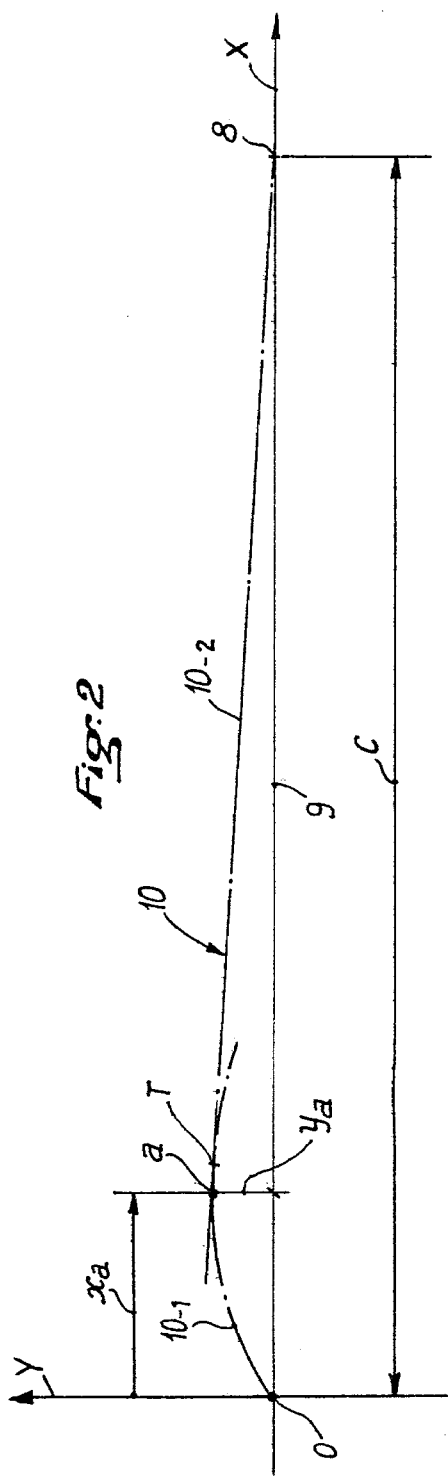
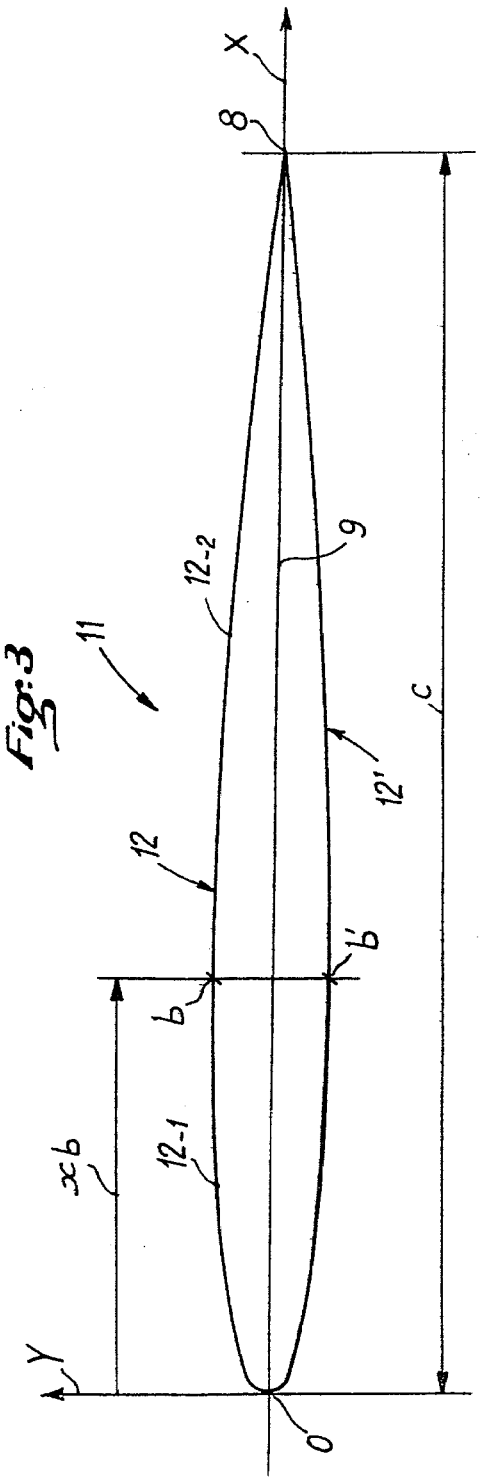
Fig.2
Fig.3

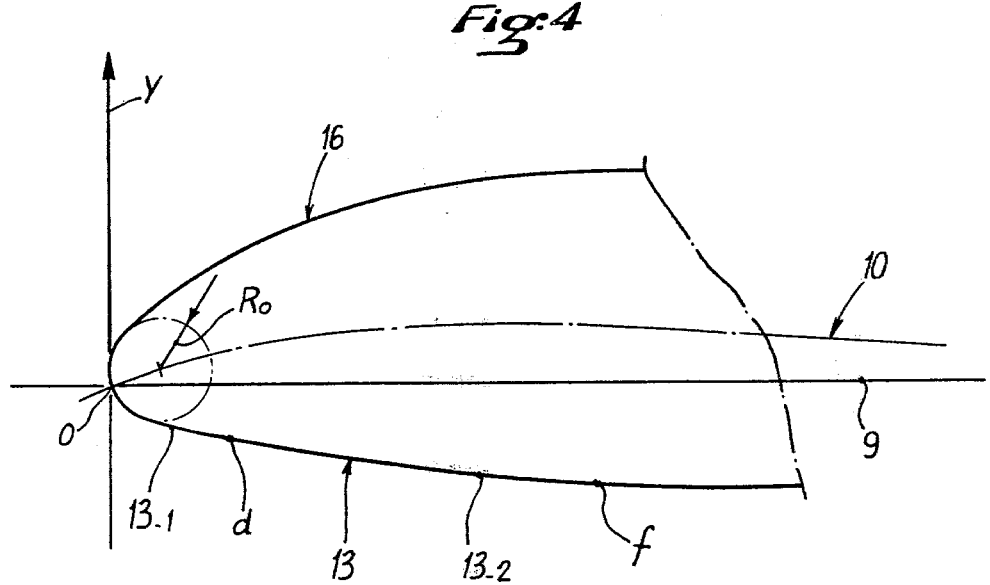
Fig:4
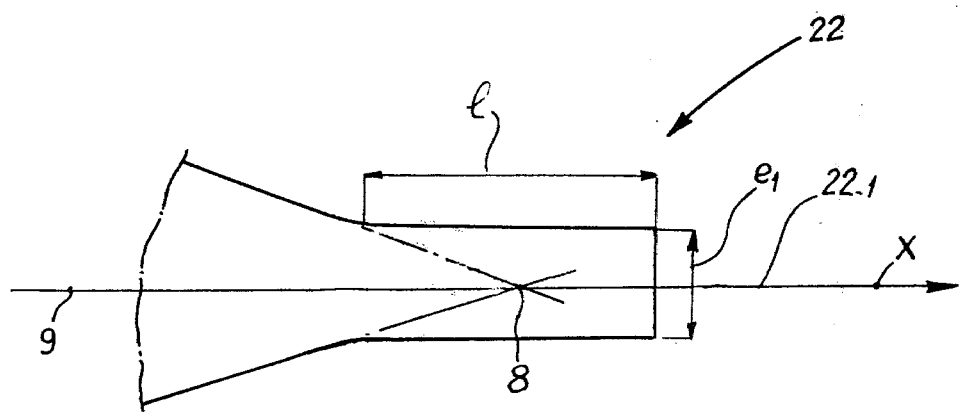
Fig:7

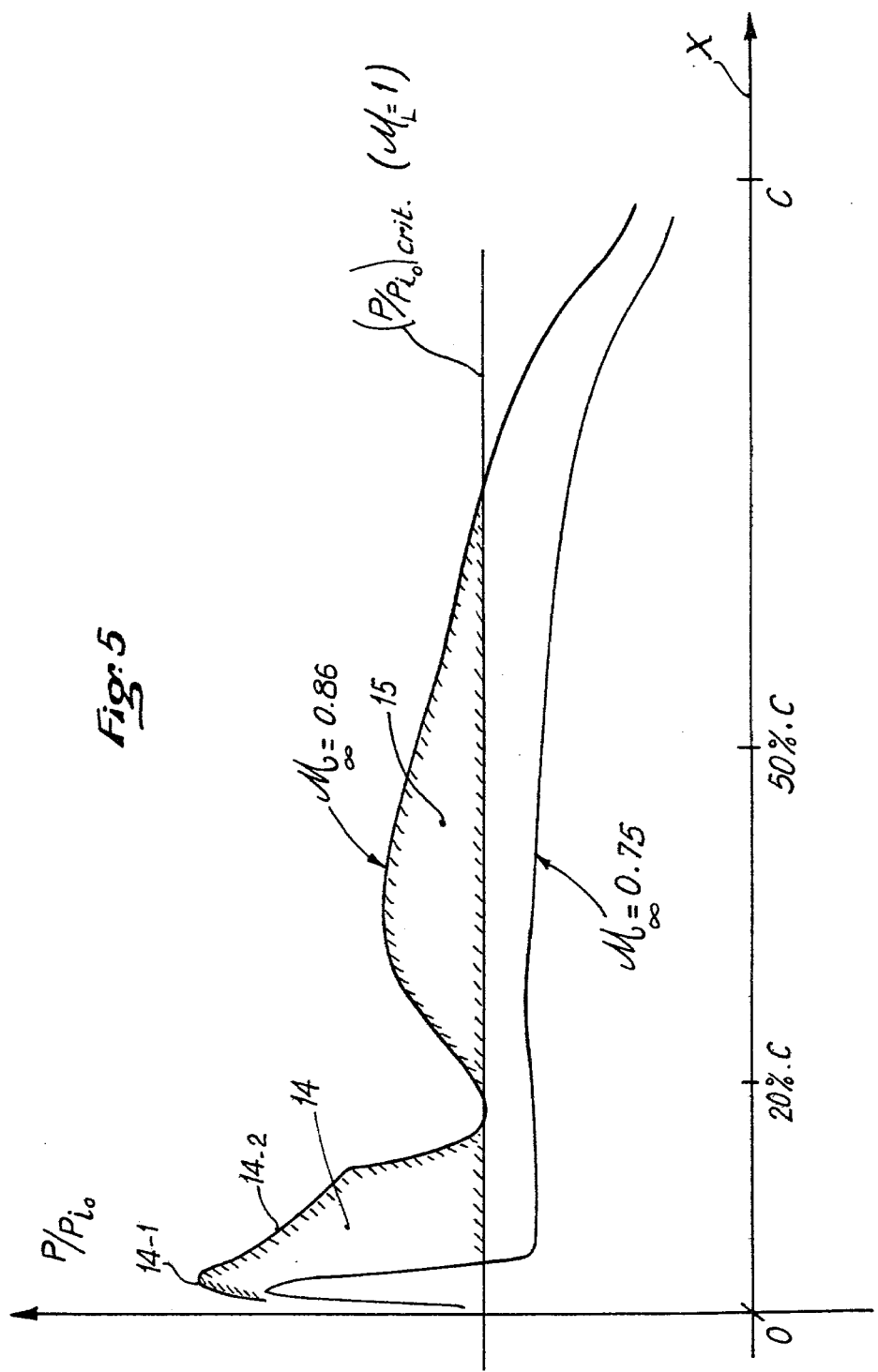

BLADE PROFILE FOR ROTARY WING OF AN AIRCRAFT

The present invention relates to the aerodynamic airfoil profiles used for lifting rotary wing aircraft and, more particularly, relates to a family of airfoil profiles for helicopter rotor blades.

It is known that helicopter rotor blades must be defined to function in a plurality of different flight envelopes. In fact, hovering, high speed flight and flight manoeuvres, are the main ones distinguished.

To obtain satisfactory performances in these three main flight envelopes, it is necessary to make a difficult compromise between different parameters in order to define a blade profile which is sufficiently adapted for these envelopes.

For example, to reduce the power absorbed by the rotor, in the case of hovering, the aerodynamic efficiency of the profile must be improved, whilst, to reduce the interaction due to the vortices of the preceding blade on the end of the following blade, the level of the lift coefficient ($C_z$) at the drag divergence Mach number must also be improved.

Similarly, to reduce the considerable drag due to the advancing blade on the rapid machines, it is necessary to increase the value of the drag divergence Mach number.

These improvements and this increase of the drag divergence Mach number must in addition be made for as high as possible a range of the Mach number, both concerning the speed of rotation of the rotor, and the speed of advance of the helicopter.

Moreover, one imperative for the helicopter blade profiles is to obtain a zero lift moment coefficient $Cm_o$, which is as low as possible, as it determines the level of the efforts on the rods controlling the pitch of the blades. Thus, a high $Cm_o$ promotes the production of vibrations and affects the life duration of the rotor control chain.

It is therefore an object of the present invention to define a family of aerodynamic airfoil profiles for helicopter rotor blade, capable of very high performances both during hovering and high speed flight, without altering the performances of the machine in manoeuvres.

The particular geometry of said profile, marked particularly by the presence of numerous local characteristics, gives said profile a considerable aerodynamic efficiency and enables an appreciable value to be obtained for the drag divergence Mach number.

These profiles, which are perfectly adapted to function in the above-mentioned flight envelopes, have a very low moment coefficient, a very low drag coefficient and enable a blade to be produced which has an excellent structural rigidity.

To this end, according to the invention, a blade profile for the rotary wing of an aircraft, comprising between the leading edge and the trailing edge a convex upper surface and a non-concave lower surface, is characterised in that, at the point of maximum curvature of the leading edge, the radius of curvature Ro is approximately defined by the expression $Ro = 1.7\ C.\ e^2_{max}$, in which C represents the chord and $e_{max}$ the maximum relative thickness of said profile, and the portion of lower surface adjacent said leading edge comprises a first lower surface zone immediately adjacent the leading edge and extending to a few percent of the chord C, in which the curvature decreases rapidly in the direction of the trailing edge and a second lower surface zone prolonging the first and extending up to about 20% of the chord from said leading edge, this second lower surface zone having a very small general curvature decreasing continuously in the direction of the trailing edge up to the point of minimum curvature of the lower surface which is located at the end of said second zone.

The appearance of an intense shock wave in the part of the lower surface close to the leading edge is thus avoided, this preventing the separation of the boundary layer, with the result that the drag coefficient is low and the drag divergence Mach number is high in the case of rapid flight.

Said second lower surface zone preferably extends over about 15% of the total length of the lower surface.

If the profile is related to a system of orthogonal axes OX,OY, in which the origin O is the point of maximum curvature of the leading edge, OX the chord of the profile oriented from the leading edge towards the trailing edge and OY an axis perpendicular to OX and oriented from the lower surface towards the upper surface, it is advantageous if said second lower surface zone and possibly a part of the first, are defined approximately by a formula of the type:

$$y = n_1 x^2 + n_2 x + n_3$$

in which $n_1$, $n_2$ and $n_3$ are constant coefficients and x and y the coordinates related to the length of the chord of the profile. In the case of the maximum relative thickness being chosen to be equal to 0.09, whilst the chord C is chosen to be equal to the unit of measurement, said coefficients may have the following approximate values:

$n_1 = 0.821393$
$n_2 = -0.284150$
$n_3 = -0.005602$

The part of the upper surface consecutive to the leading edge is advantageously defined approximately by a formula of type:

$$y = p_1 x^2 + p_2 x + p_3$$

over an upper surface length corresponding at maximum to 20% of the chord, the different $p_i$ being constant coefficients and x and y the coordinates related to the length of the chord of the profile. In the case of the maximum relative thickness being chosen equal to 0.09, whilst the chord C is chosen to be equal to the unit of measurement, said coefficients may have the following approximate values:

$p_1 = -1.667230$
$p_2 = +0.596885$
$p_3 = 0.005873$

For reasons of local adjustment of air flow and of construction, the profile comprises a trailing edge ledge integrated in the rear part, whose length is close to 5% of the chord of the profile, and whose thickness is at the most equal to one tenth of its length.

To be able to define and easily produce the profile according to the invention, a process may be used which consists in establishing a continuous skeleton or mean line, which passes through the point of maximum curvature of the leading edge and through the trailing edge of the profile to be constructed and which comprises, on the one had, a first portion convex towards the upper surface extending between said point of maximum curvature of the leading edge and the point of said skeleton most remote from the chord of said profile, of which the projection on the chord is at a distance included between 12 and 20% of the length of the chord starting from said point of maximum curvature of the leading edge and which is distant from the chord by about one tenth of the preceding distance, and, on the other hand, a second substantially rectilinear portion extending approximately from the point most remote from the chord up to the trailing edge, in establishing, furthermore, a symmetrical biconvex profile which presents a chord identical to that of the profile to be constructed and of which the maximum relative thickness is at about one third of the chord and is comprised between 6 and 13% of the chord, after which, for each point of the chord of said biconvex profile, the distance from the lower surface and upper surface points to the chord is measured and the distance thus measured is plotted at each corresponding point of the mean line of the profile to be constructed, at right angles and on either side of said line, so as to obtain the profile to be constructed. This skeleton being related to the system of axes mentioned previously, its first convex portion may be defined approximately by a formula of type:

$$Y = k_1 x^3 + k_2 x^2 + k_3 x + k_4 x^{\frac{1}{2}},$$

the different $k_i$ being constant coefficients and $x$ and $y$ the coordinates related to the length of the chord of the profile.

If the projection on the chord of the point of the skeleton most remote from the chord is at 16% of the chord starting from the point of maximum curvature of the leading edge, said coefficients may have the following approximate values:
$k_1 = 2.0327$
$k_2 = -1.1146$
$k_3 = 0.1826$
$k_4 = 0.0175$ The biconvex profile used is advantageously such that its lower surface or upper surface part comprised between its leading edge and its chordwise point of maximum thickness, is approximately defined by an equation of the following form:

$$y = k_5 x^3 + k_6 x^2 + k_7 x + k_8 x^{\frac{1}{2}} + k_9$$

whilst the part of the lower surface or of the upper surface of said biconvex profile comprised between said maximum thickness and its trailing edge is approximately defined by an equation of the form $$y = k_{10} x^2 + k_{11} x + k_{12}$$

the different $k_i$ being constant coefficients and $x$ and $y$ the coordinates relating to the length of the chord of the profile.

If the maximum thickness of said biconvex profile is approximately equal to 9% of the chord, said coefficients may have the following approximate values:
$k_5 = -0.1172$
$k_6 = 0.0071$
$k_7 = -0.1068$
$k_8 = 0.1446$
$k_9 = 0.0006$
$k_{10} = -0.1153$
$k_{11} = 0.0844$
$k_{12} = 0.0295$ Thus, due to the invention, rotary wings for aircraft, which have particularly good performances may be obtained. It will be noted that it is not indispensable, in order to obtain the favourable effects mentioned, for the whole of each blade of such a rotary wing to present the profile of the invention. The main point is that the end section of the blades has this profile. For example, for a rotary wing having a radius equal to R, it is generally sufficient for the end section of each blade, included between 0.75 R and 0.9 R, to be in accordance with the invention.

The invention will be more readily understood on reading the following description with reference to the accompanying drawings, in which:

FIG. 1 is a general view of the profile according to the invention, related to the system of orthogonal axes OX,OY defined hereinabove.

FIG. 2 schematically shows, on a larger scale, the skeleton or mean line of the profile according to the invention.

FIG. 3 shows a symmetrical biconvex profile from which may be defined the profile according to the invention, with the aid of the skeleton of FIG. 2.

FIG. 4 is an enlarged view of the leading edge region of the profile of FIG. 1.

FIG. 5 is a diagram illustrating the development of the ratio of the pressures $P/P_{io}$ ($P$=pressure on the surface of the profile at the point of abscissa X, $P_{io}$=upstream infinite pressure) on the lower surface of the profile according to the invention for two Mach numbers and for a lift coefficient close to zero, this diagram showing for the highest Mach number a supersonic flow zone between the leading edge and at the most 20% of the chord, followed by a supersonic flow zone without shock.

Figure 6:
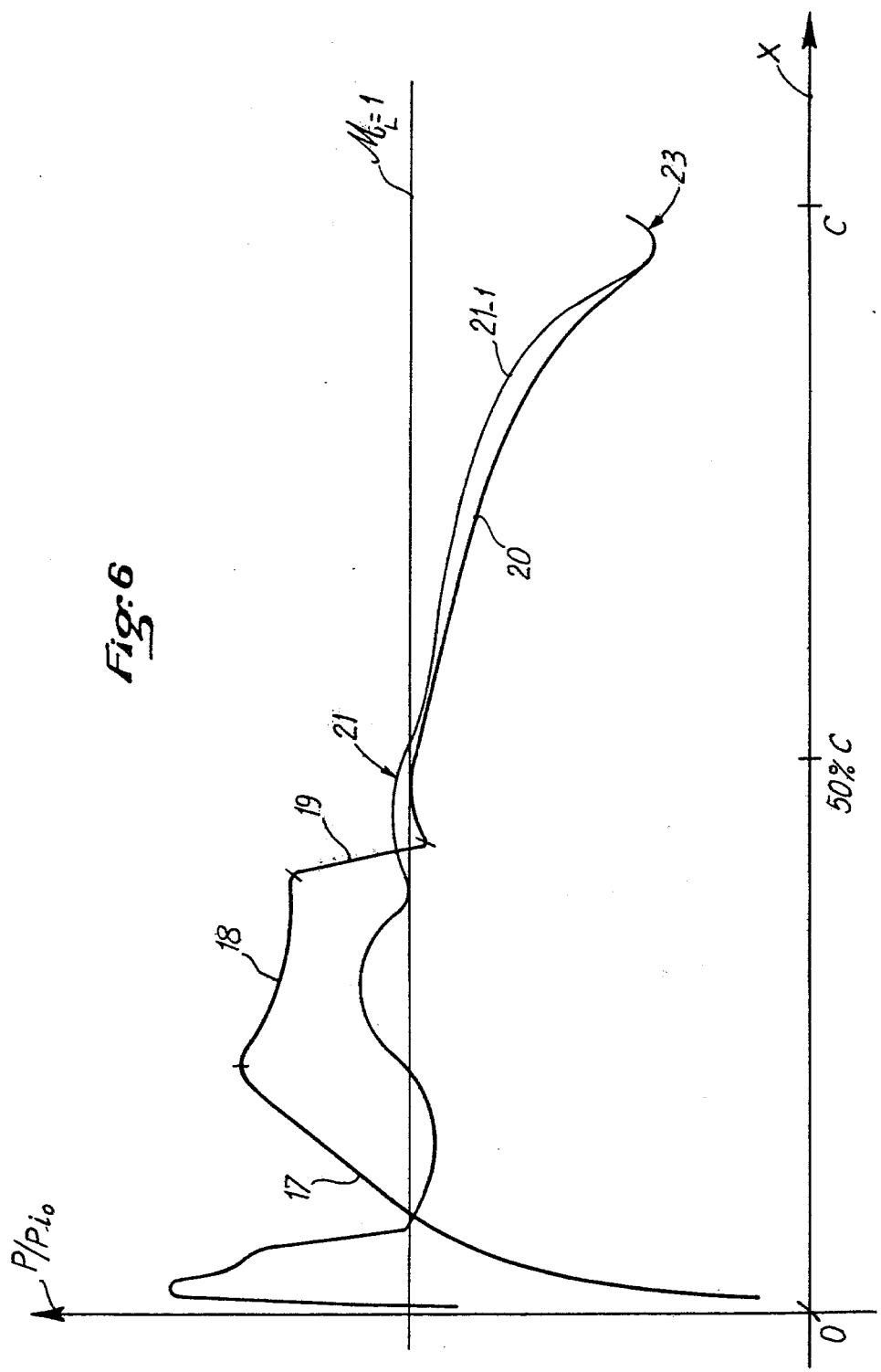

FIG. 6 is a diagram illustrating the development of the ratio of pressure $P/P_{io}$ on the upper surface and on the lower surface for an upstream infinite Mach number slightly higher than 0.8 and a lift coefficient close to zero.

Figure 1:
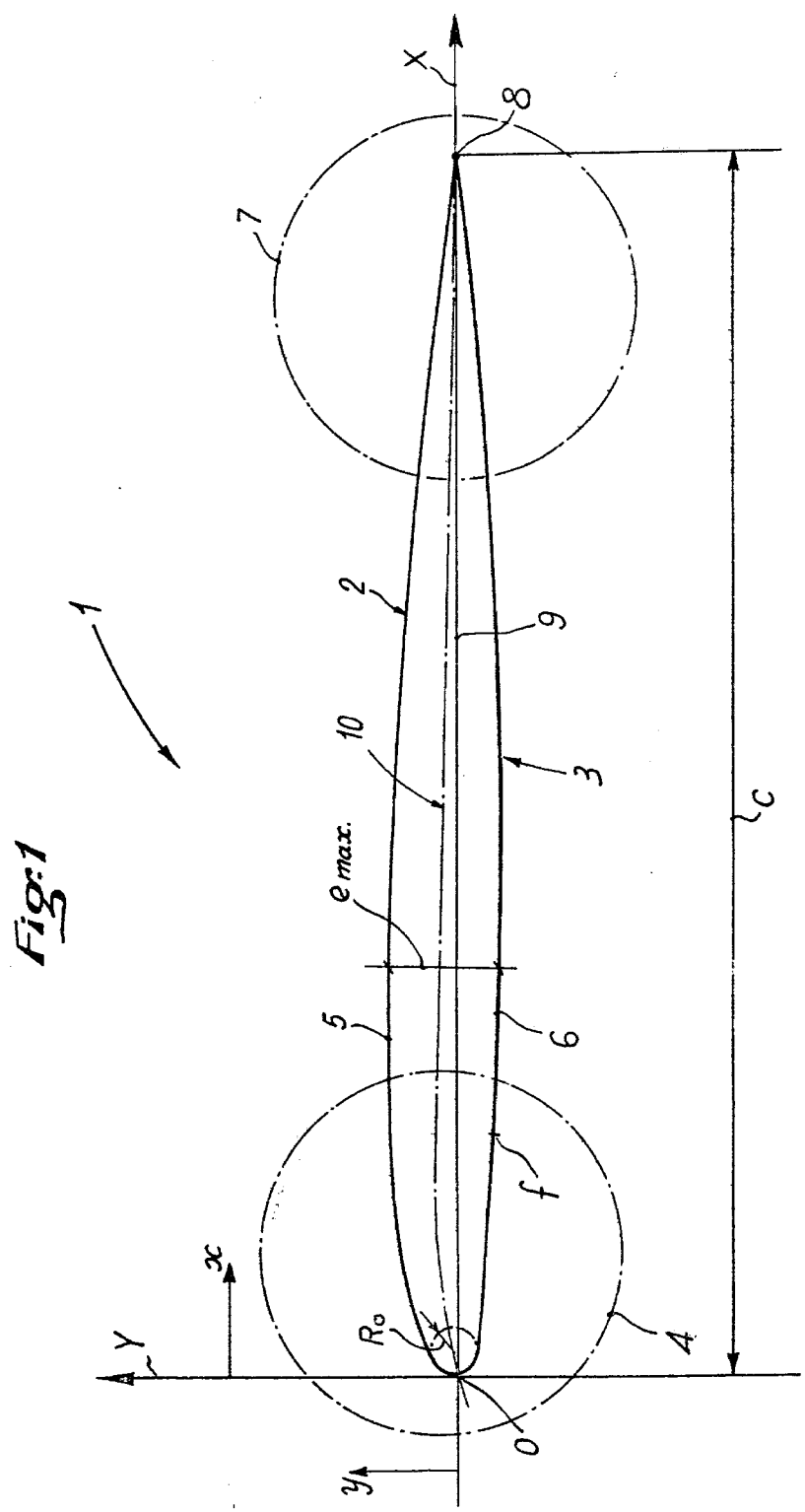

FIG. 7 is an enlarged view of the trailing edge region of the profile of FIG. 1.

Referring now to the drawings, and as shown in FIG. 1, a profile 1 according to the invention, composed of an upper part 2 and a lower part 3, essentially comprises a leading edge region 4 followed by an upper surface line 5 and a lower surface line 6, these lines defining in the rear part of the profile a trailing edge region 7.

To facilitate the description, the profile of FIG. 1 is related to a system of axes OX,OY at right angles to each other at point O, which is merged with the point of the region of the leading edge where the radius of curvature is minimum.

The axis OX, which passes through the point of the trailing edge 8, is, moreover, merged with the chord 9 of the profile.

The system of axes OX, OY of which the positive directions are indicated by the arrows given in FIG. 1, serves as reference for reduced coordinates, i.e. to abscissae $x$ and to ordinates $y$, related respectively to the length C of the chord of the profile. Furthermore, for determining the outer contour of a profile, a mean line 10 or skeleton is, in particular, considered, passing through the point O and point 8, which represents the geometric location of the points equidistanct from lines 2 and 3.

In fact, it is by deforming a type of symmetrical biconvex profile about a particular mean line that a profile according to the invention may for example be defined. Thus, the mean line 10, more explicity shown in FIG. 2, essentially comprises a curved line 10-1 followed by a quasi-rectangular line 10-2, these lines being separated from each other by a point a of abscissa $x_a$ and of ordinate $y_a$, this latter value representing the maximum sweepback of the line 10.

The abscissa $x_a$ is preferably included between limits equal at least to 12% of the length of the chord C of the profile, and at the most to 20% of the length of said chord, for a value of maximum sweep-back $y_a$, equal in both cases to about 10% of the value of the abscissa $x_a$.

The line 10-1, comprised between the points 0 and a, is generally defined approximately by an equation (1) follows:

$$y = k_1 x^3 + k_2 x^2 + k_3 x + k_4 x^{\frac{1}{2}} \tag{1}$$

in which expression the values $k_1$, $k_2$, $k_3$ and $k_4$ represent positive or negative constants, whilst line 10-2 which passes through the point 8 is virtually rectilinear over at least three quarters of the distance separating points a and 8, said line 10-2 being connected tangentially to line 10-1, at a point T, located near and to the rear of the point a (cf. FIG. 2).

According to a preferred form of definition, established for an abscissa $x_a$ equal to 16% of the length of the chord C, i.e. for a maximum sweep-back $y_a$ equal to 1.6% of C, the general pattern of the line 10-1 is precisely reproduced when the coefficients of equation (1) take the following values:

$$(2) \quad \begin{cases} k_1 = 2.0327 & k_2 = -1.1146 \\ k_3 = 0.1826 & k_4 = 0.0175 \end{cases}$$

From this particular definition of line 10-1, the other definitions are obtained, for example, due to a geometical similarity between the ordinates, of which the constant value of the similarity ratio is equal to that determined by the ratio of the maximum sweep-backs considered, the line 10-2 being in all cases connected tangentially in the zone located immediately behind point a.

FIG. 3 shows a type of symmetrical biconvex profile 11 adapted to be deformed symmetrically on either side of a mean line or skeleton.

This profile comprises an upper line 12 and a lower line 12' disposed symmetrically on each side of the axis OX and, with a view to facilitating the description, allows the same chord 9 of length C as the profile shown in FIG. 1.

The chordwise point of maximum thickness of the profile 11 shown by the segment b-b' is furthermore located at an abscissa $x_b$ equal to one third of the chord C and the distance b-b' which in fact constitutes the maximum thickness is at least equal to 6%, and at the most equal to 13%, of the value of the chord of said profile. The upper line 12 is composed of a first curved line 12-1 starting at point 0 and stopping at point b, prolonged from point b by a second curved line 12-2 limited towards the rear of the profile by the trailing edge 8.

According to a preferred form of definition allowing at one third of the chord a maximum thickness of 9%, the line 12-1 is mainly determined in the system of axes OX,OY by the equation (3):

$$y = k_5 x^3 + k_6 x^2 + k_7 x + k_8 x^{\frac{1}{2}} + k_9 \tag{3}$$

with:
$$(4) \quad \begin{bmatrix} 0 \leq x \leq 0.33 \\ k_5 = -0.1172 & k_6 = 0.0071 & k_7 = -0.1068 \\ k_8 = 0.1446 & k_9 = 0.0006 \end{bmatrix}$$

whilst the line 12-2 is mainly determined by the following equation (5):

$$y = k_{10} x^2 + k_{11} x + k_{12} \tag{5}$$

with
$$(6) \quad \begin{bmatrix} 0.33 \leq x \leq 1 \\ k_{10} = -0.1153 & k_{11} = 0.0844 & k_{12} = 0.0295 \end{bmatrix}$$

The different mathematic equations mentioned hereinabove are of course valid for a unitary chord.

Furthermore, the definition of symmetrical profiles having a maximum thickness comprised between 6 and 13% of the value of the chord are obtained, for example, by multiplying the ordinates of lines 12 and 12', previously described, by a similarity ratio formed at the numerator by the value of the maximum thickness in question and at the denominator by the reference value of 0.09.

Thus, the deformation of the symmetrical biconvex profile 11 about the adequate mean line 10 enables a profile to be defined which presents a particular development of curvature in a lower surface region 13 of the leading edge (cf. FIG. 4). This development avoids the appearance of an intense shock wave in this part of the lower surface, which eliminates the separation of the boundary layer and enables, for rapid flight, a low drag coefficient and a high drag divergence Mach number close to 0.85 to be obtained. It will be recalled that, by convention, the drag divergence Mach number is the Mach number $M_{DX}$ where the increase of the drag coefficient $C_x$ appears and where the slope $$\frac{\partial C_x}{\partial M}$$

of the equation $C_x = f(M)$ is equal to 0.1. These remarkable results are obtained in particular by a radius of curvature Ro at the leading edge 0 equal approximately to the value defined by the expression:

$$Ro = 1.7 \, C \, e_{max}^2, \tag{7}$$

where C represents the chord and $e_{max}$ the maximum thickness of the profile (cf. FIG. 1). As indicated more explicitly in FIG. 4, the lower surface portion 13 essentially comprises a line 13-1 and a line 13-2 separated from one another by a point designated d.

Line 13-1, which starts at point O and which consequently comprises a part of the osculatory circle of the leading edge, has a curvature which decreases rapidly from point O to point d, this latter point being located, with respect to point O, at a distance equal to a few percent of the length of the chord C.

Line 13-2, defined by points d and f, possesses between these two points a very small general curvature, which decreases from point d to point f to become minimum at point f. The point f is preferably located at 20% from the leading edge O and the portion of line of small curvature between points d and f represents in length about 15% of the lower surface. Due to these geometric characteristics, a relatively stable supersonic zone 14 is obtained on the lower surface for upstream infinite Mach numbers of between 0.75 and 0.86, said zone having a supervelocity peak 14-1 of low level, which precedes a considerable recompression 14-2. Moreover, the supersonic zone which does not pass beyond the point of minimum curvature f is followed, virtually up to half of the chord of the profile, by a sonic zone 15 without shock (cf. FIG. 5).

This functioning which translates a perfect control of the surface flow of the profile in this region of the leading edge is advantageously reproduced when a mean line such as defined by equations (1) and (2) on the one hand, is considered, and the symmetrical profile as defined by equations (3), (4), (5) and (6), on the other hand.

Thus, the application of the preferential relationships indicated by equations (1) to (6) makes it possible for example to define a part of the portion 13 with the aid of the following approximate resultant expression:

$$y = 0.821393\ x^2 - 0.284150\ x - 0.005602 \qquad (8)$$

the radius of the leading edge being for a unitary chord and a minimum thickness equal to 0.09, approximately defined by application of the equation (7), i.e. approximately equal to 0.014.

In this example, the point of minimum curvature of the lower surface remains located at 20% from the leading edge, and the term "approximately" indicates that the accuracy of the definition obtained is compatible with the normal manufacturing tolerances.

Similarly, the upper surface portion 16 located in the region of the leading edge 4 (cf. FIG. 4), is determined taking into account the equations (1) to (6), by the following simplified expression:

$$y = -1.667230\ x^2 + 0.596885\ x + 0.005873, \qquad (9)$$

with $$0 \leqq x \leqq 0.17$$

As shown in FIG. 6, the use of a radius of leading edge such as defined by general equation (7) and more precisely the combination of a radius equal to about 0.014 with the above equation (9), makes it possible to obtain a particular pattern of the distribution of the pressures on the upper surface. For example, for an upstream infinite Mach number greater than 0.8 and a lift coefficient Cz close to zero, a regular rise is noted of the supervelocity line which becomes maximum at about 20% of the length of the chord, then, the appearance of a large line of slow and regular precompression 18, which precedes a moderate shock 19. Thus, the succession of these flow lines, combined on the one hand with a convex and regular recompression line 20 and on the other hand with the distribution of the pressures on the lower surface indicated by line 21, enables, in particular, a low drag coefficient Cx and a very high divergence Mach number associated therewith to be obtained.

Moreover, the distribution of a symmetrical profile about a quasi-rectangular mean line, placed in the rear half-chord of the profile, determines lines of recompression 20 and 21-1 (cf. FIG. 6) very close to each other, this essentially leading to giving a virtually zero moment coefficient $C_{mo}$. Furthermore, to increase the holding of the trailing edge 8 and to allow the possible adjustment of $C_{mo}$, it is advantageous to place a trailing edge ledge or tongue 22 in the zone of the trailing edge 7 (FIG. 1).

As shown in FIG. 7, the trailing edge ledge 22 has its axis of construction 22-1 aligned with the chord 9 of the profile.

The effect of this arrangement of the ledge, which enables the airflow on the profile to be locally adjusted, as shown for example by the variation in pressure 23 indicated in FIG. 6, is under certain conditions of functioning, to reduce the value of the coefficient $C_{mo}$. The length l of the ledge is preferably equal to 5% of the chord of the profile and its thickness $e_1$ is at the most equal to one tenth of its length.

Due in particular to the combined use of a particular radius Ro of the leading edge, a particular portion of lower surface 13, a portion of upper surface 16 and a trailing edge region 7 comprising a ledge 22, the profile according to the invention is thus perfectly adapted to be used in a blade end zone, located between 0.75 R and 0.9 R, the letter R designating the radius of the blade with respect to the axis of the rotor (not shown).

Comparative tests made under the same conditions, have produced noteworthy results with respect to a conventional reference profile NACA 0012.

For example, the drag coefficient Cx is reduced by nearly 20% whilst the drag divergence Mach number $M_{DX}$ is increased by 8%.

Moreover, the coefficient $C_{mo}$ remains, for upstream infinite Mach numbers equal to or greater than 0.8, virtually zero.

The excellent compromise made between the different parameters of definition of the profile ensures high performances in flight, particularly at high speed and whilst hovering.

The profile according to the invention therefore makes it possible to define a blade with a high propulsive and carrier yield, applicable to all types of rotors of aircraft such as helicopters.

We claim:

1. A blade profile for rotary wing of an aircraft, comprising between the leading edge and the trailing edge, a convex upper surface and a non-concave lower surface, wherein at the point of maximum curvature of the leading edge, the radius of curvature Ro is approximately defined by the expression Ro = 1.7 C. $e_{max}^2$, in which C represents the chord and $e_{max}$ the maximum relative thickness of said profile, and the portion of lower surface adjacent said leading edge comprises a first lower surface zone immediately adjacent the leading edge and extending to a few percent of the chord C, in which the curvature decreases rapidly in the direction of the trailing edge and a second lower surface zone prolonging the first and extending up to about 20% of the chord from said leading edge, this second lower surface zone having a very small general curvature decreasing continuously in the direction of the trailing edge up to the point of minimum curvature of the lower surface which is located at the end of said second zone.

2. A blade profile as claimed in claim 1, wherein said second lower surface zone extends over about 15% of the total length of the lower surface.

3. A blade profile as claimed in claim 1, related to a system of orthogonal axes OX, OY in which the origin O is the point of maximum curvature of the leading edge, OX the chord of the profile oriented from the leading edge towards the trailing edge and OY an axis perpendicular to OX and oriented from the lower surface towards the upper surface, wherein said second lower surface zone and possibily a part of the first are defined approximately by a formula of type:

$$y = n_1 x^2 + n_2 x + n_3$$

in which $n_1$, $n_2$, $n_3$, $n_4$ and $n_5$ are constant coefficients and x and y the coordinates related to the length of the chord of the profile.

4. A blade profile as claimed in claim 3, in which the maximum relative thickness is chosen to be equal to 0.09, whilst the chord C is chosen to be equal to the unit of measurement, wherein said coefficients have the following approximate values:

$n_1 = 0.821393$
$n_2 = -0.284150$
$n_3 = -0.005602$

5. A blade profile as claimed in claim 1, related to a system of orthogonal axes OX, OY, in which the origin O is the point of maximum curvature of the leading edge, OX the chord of the profile oriented from the leading edge towards the trailing edge and OY an axis perpendicular to OX and oriented from the lower surface towards the upper surface, wherein the part of the upper surface consecutive to the leading edge is defined approximately by a formula of type:

$$y = p_1 x^2 + p_2 x + p_3$$

over a length of upper surface corresponding at maximum to 20% of the chord, the different $p_i$ being constant coefficients and x and y the coordinates related to the length of the chord of the profile.

6. A blade profile as claimed in claim 5, in which the relative maximum thickness is chosen to be equal to 0.09, whilst the chord C is chosen to be equal to the unit of measurement, wherein said coefficients have the following approximate values:

$p_1 = -1.667230$
$p_2 = 0.596885$
$p_3 = 0.005873$
with
$0 \leq x \leq 0.17$

7. A blade profile as claimed in claim 1, wherein it comprises a trailing edge ledge whose length is close to 5% of the chord of the profile, and whose thickness is at the most equal to one tenth of its length.

8. A rotary wing for an aircraft having at least two blades, wherein at least one part of each blade presents a profile as claimed in one of claims 1 to 7.

9. A rotary wing as claimed in claim 8, having a radius equal to R, wherein said one part of each blade extends between 0.75 R and 0.9 R from the axis of rotation of the wing.

* * * * *

UNITED STATES PATENT AND TRADEMARK OFFICE
CERTIFICATE OF CORRECTION

PATENT NO. : 4,325,675
DATED : April 20, 1982
INVENTOR(S) : JACQUES GALLOT ET AL.

It is certified that error appears in the above-identified patent and that said Letters Patent are hereby corrected as shown below:

Cover page, Item [75], line 3, "V. de Paul" should be --Vincent de Paul--.

Cover page, Item [75], line 4, "Verriere-le Buisson" should be --Verriere-le-Buisson--.

Signed and Sealed this

Tenth Day of May 1983

[SEAL]

Attest:

GERALD J. MOSSINGHOFF

Attesting Officer

Commissioner of Patents and Trademarks